United States Patent [19]

Caillier, Sr.

[11] Patent Number: 4,663,835

[45] Date of Patent: May 12, 1987

[54] METHOD OF APPLYING ELECTRIC MOTOR ARMATURE INSULATION

[75] Inventor: George A. Caillier, Sr., Gainsville, Ga.

[73] Assignee: The Singer Company, Stamford, Conn.

[21] Appl. No.: 812,491

[22] Filed: Dec. 23, 1985

[51] Int. Cl.$^4$ .............................................. H02K 15/10
[52] U.S. Cl. ................... 29/598; 264/272.2; 310/43
[58] Field of Search ............ 29/598, 597; 310/43; 264/272.2

[56] References Cited

U.S. PATENT DOCUMENTS

| | | | |
|---|---|---|---|
| 2,756,354 | 7/1956 | Baron | 310/43 |
| 3,244,919 | 4/1966 | Dventh et al. | 310/43 |
| 3,827,141 | 8/1974 | Hallerback | 310/43 X |
| 4,263,711 | 4/1981 | Sakano et al. | 29/598 X |

Primary Examiner—Carl E. Hall
Attorney, Agent, or Firm—David L. Davis

[57] ABSTRACT

A continuous electric motor armature insulation arrangement is disclosed together with a method for providing such continuous insulation by the use of mold segments which engage a narrow continuous ledge around each armature slot which by the application of pressure seals the mold cavity against escape of injected insulation material and prevents intrusion of insulation into the armature slots.

1 Claim, 6 Drawing Figures

U.S. Patent   May 12, 1987   4,663,835
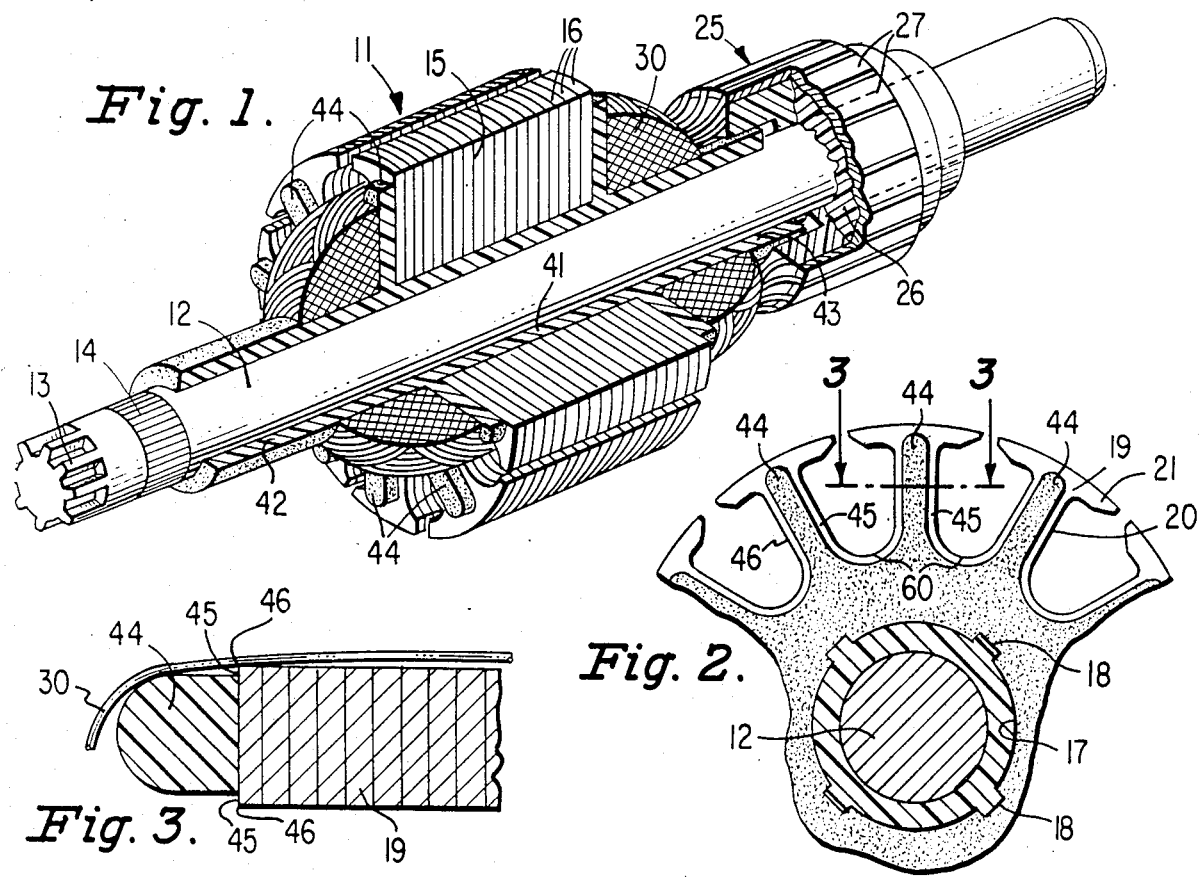
Fig. 1.
Fig. 2.
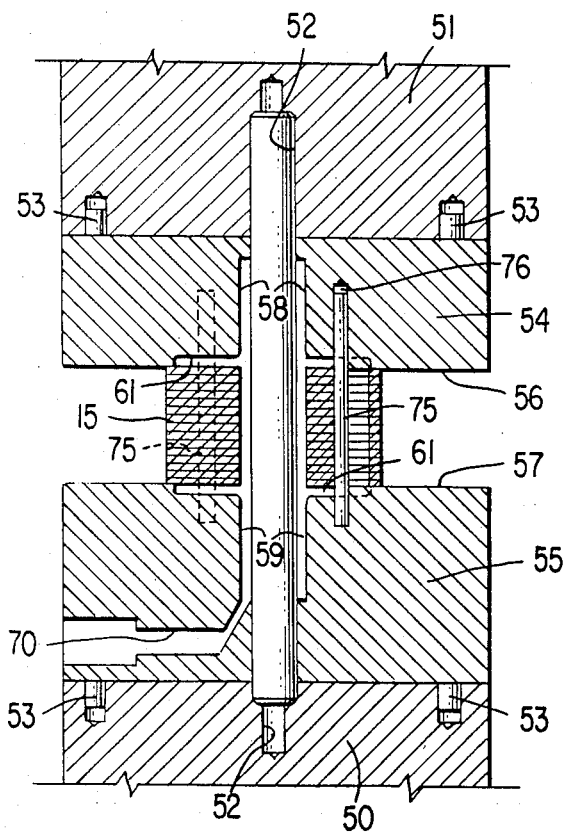
Fig. 3.
Fig. 4.
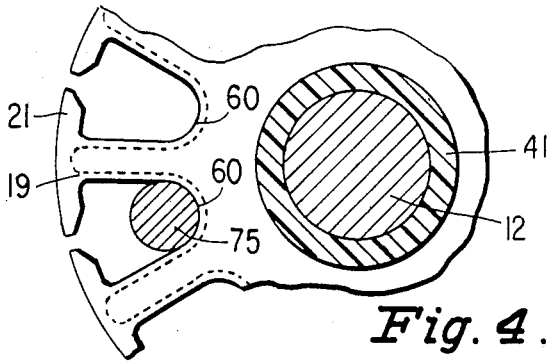
Fig. 4.
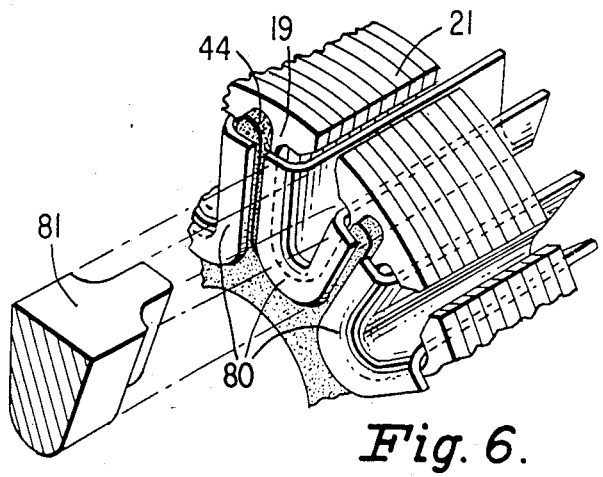
Fig. 6.

METHOD OF APPLYING ELECTRIC MOTOR ARMATURE INSULATION

FIELD OF INVENTION

This invention relates to electric motor armature construction and, more particularly, to electric motor armature insulation and a method of applying electrical insulation between motor shaft, laminated armature core, and armature core coils.

BACKGROUND OF INVENTION

One well known technique for providing electric motor armature insulation is disclosed in the Perkins U.S. Pat. No. 2,831,991, Apr. 22, 1958, in which core end laminations of insulating material are fabricated separately and require individual handling during assembly of the motor armature. This construction is ill-suited to automated motor fabricating methods.

Studer the U.S. Pat. No. 2,232,812, Feb. 25, 1941, discloses an armature insulation arrangement in which layers of insulating material covering each end of the armature core laminations are formed integrally with core slot insulation. This insulation arrangement, whether molded separately and applied to the armature or molded directly onto the armature core laminations, requires complicated and expensive molds and seriously detracts from the cross sectional space available for wire coils in the core lamination slots.

Robinson et al The U.S. Pat. No. 3,917,967, Nov. 4, 1975, discloses a motor armature insulation arrangement in which molded insulating material is applied between the shaft and armature coil laminations and against the end laminations of the armature core but only to a diameter approximating the root diameter of the armature core slots. The annular recesses in the insulating material adjacent each armature coil end lamination, which are important in the Robinson et al teaching, would require complicated molds not conducive to cost effective production methods.

SUMMARY OF THE INVENTION

It is an object of this invention to provide an electric motor armature insulation arrangement and a method for producing it which is highly effective in establishing multiple insulation barriers between the motor actuating electric windings and the drive shaft and motor frame without impairing the efficiency of motor operation. A further object of this invention is to provide an electric motor armature insulating arrangement which may be produced using simple molds and tools which are particularly adapted for cost effective automatic operation. It is also an object of this invention to provide an integrally molded motor armature insulation arrangement and method for producing it without introducing any of the molded insulating material into the armature slots or between the armature core laminations.

BRIEF DESCRIPTION OF THE DRAWINGS

This invention is illustrated in the accompanying drawings in which:

FIG. 1 is a perspective view of an electric motor armature in accordance with this invention with a segment broken away more clearly to illustrate the construction;

FIG. 2 is an end elevational view of the armature of FIG. 1 without windings or armature slot insulation;

FIG. 3 is an enlarged cross sectional view taken substantially along line 3—3 of FIG. 2 showing one slot defining radial arm of the armature core together with one winding of wire traversing the radial arm;

FIG. 4 is a cross sectional view of a mold configuration suitable for producing armatures in accordance with the methods of this invention;

FIG. 5 is an enlarged cross sectional view taken substantially along line 5—5 of FIG. 4 showing the relationship of the mold to one radial arm of the armature core; and FIG. 6 is a perspective view of a portion of an armature core showing a sheet of slot insulating material together with a tool for crimping the slot insulating sheet.

DETAILED DESCRIPTION

Referring particularly to FIG. 1, the drawings illustrate an electric motor armature indicated generally at 11. The armature comprises a metallic motor shaft 12 which may be formed with a drive pinion 13 or fastening means for a drive pulley or the like. The shaft includes a central preferrably knurled section 14. Located on the knurled shaft section 14 is an armature core 15 comprising an aligned stack of identical laminations 16. Each lamination includes a central shaft accommodating clearance aperture 17 which, as shown in FIG. 2, is larger in diameter than the knurled shaft section 14 and may be formed with shallow notches 18. About the periphery, each lamination 16 is formed with a series of evenly spaced radial arms 19 defining therebetween armature core slots 20, which slots in the assembled stack of laminations extend parallel to the axis of the motor shaft. At the free extremity, each radial arm 19 may be formed with a laterally extended T-shaped head 21 as is conventional in motor armature construction.

As shown in FIG. 1, a commutator 25 is carried by the motor shaft spaced axially from the armature core 15. The commutator may include a base 26 of dielectric material molded or otherwise attached to the motor shaft with spaced bars 27 of electrically conductive material embedded in the periphery. Wire coils 30 extend from selected commutator bars 27 and through appropriate ones of the armature core slots 20.

Although the wire comprising the coils 30 is insulated, the present invention provides for additional insulating material isolating the armature core 15 from the shaft and the shaft 12 from the wire coils 30. In addition, the additional insulating material is applied in such a fashion as to secure the principle parts of the armature in assembled relation and to protect the wire insulation from damage at the abrupt corners of the armature core slots.

To this end, a single continuous band of dielectric material is provided, which as shown in the drawings, includes an annular lining 41 filling the clearance space between the shaft 12 and the armature core 15, annular sleeves 42 and 43 surrounding the motor shaft, one such sleeve at each side of the stack of armature core laminations, and fingers 44 radiating from each of the sleeves 42 and 43. Said fingers 44 at each end of the stack of armature core laminations corresponding in number to that of the radial lamination arms 19 and arranged against and secured each finger to one of the radial arms of the last lamination at each end of the stack of laminations. As shown in FIGS. 2 and 3, each of the fingers 44 is sized slightly smaller than the radial lamination arm to which it is secured so that each plastic finger 44 extends completely within the axial projection of the respective radial arm to which it is attached.

The small ledge 45 of exposed lamination surrounding each radial finger 44 as shown in FIG. 3 presents no sharp corner about which the insulated wire 30 must traverse because the presence of the finger 44 prevents contact of the wire traversely across the edge 46 of the lamination. The ledge 45 does, however, serve a significant purpose in the present armature insulation construction, as will be explained hereinbelow, in that it provides for a simple and cost effective mold arrangement which prevents intrusion of insulation material into the armature slots or between the laminations of the armature core.

Referring to FIGS. 4 and 5, the arrangement for molding the continuous motor armature insulation will now be described. In FIG. 4, 50 indicates the bottom platen or support of a hydraulic press and 51 indicates the opposing top platen of the press. In each of the platens, a locating cavity 52 for the motor shaft 12 is provided. Located relatively to the platens 50 and 51, as by tapered locating pins 53, are a pair of mold segments 54 and 55. Each of the mold segments 54 and 55 is formed with a planar lamination engaging surface 56 and 57, respectively, the surfaces 56 and 57 being parallel and opposed to each other.

Each of the mold segments 54 and 55 is formed with a cylindrical mold cavity 58 and 59, respectively, of larger diameter than the motor shaft 12 but less than the diameter of the root 60 of the armature core slots 20. Communicating with the cylindrical mold cavities 58 and 59 and extending to the planar surface 56 and 57 of each of the mold segments are a series of shallow radially extending mold cavities 61 corresponding in number and spacing to that of the radial lamination arms 19 making up the armature core to be assembled in the mold. Widthwise, the cavities 61 are dimensioned slightly smaller than that of the corresponding lamination radial arm as shown in FIG. 5.

One of the mold segments, as for instance, mold segment 55 may be formed with a port 70 for introducing by injection into the mold cavity a thermosetting insulating material.

Also carried by the mold segment 55 are a plurality of locating pins 75 each extending perpendicular to the planar surface 55 and each mating with a reception cavity 76 in the opposing mold segment 54.

The mold arrangement illustrated in FIG. 5 is useful in implementing the following method for the production of electric motor armatures.

With the press platens separated, the lower mold segment 55 is placed on the lower platen 50 in the position dictated by the locating pins 53. A stack of armature core laminations 16 is deposited on the mold segment 55 with the lowermost lamination 16 engaging the planar surface 57 of the mold segment 55. The lamination orienting pins 75 extending from the mold segment 55 in engaging the roots of selected ones of the lamination slots 20 arrange the armature core laminations in alignment with one another and center the radial arms 19 of the core laminations over the radial mold cavities 61 as shown in FIG. 5. A motor shaft may now be inserted through the clearance aperture 17 in the armature core and into the shaft locating cavity 52 in the lower platen. Next, the top mold segment 54 is arranged atop the stack of armature laminations, either oriented by the lamination orienting pins 75 fitting into cavities 76 or by prearranged orientation of the mold segment 54 by locating pins 53 with respect to the top platen 51. In either case, the radial mold cavities 61 in the upper mold segment are centered with respect to the corresponding radial arms of the topmost armature core lamination. The press platens 50 and 51 are then pressed together, bringing the planar mold segment surfaces 56 and 57 each into continuous engagement around each radial arm and slot of the armature core as shown in FIG. 5, thus providing a tight seal completely about each end of the armature core by virtue of the continuous ledge 45. A pressure of approximately 2000 lbs/in$^2$ has been found appropriate for firmly urging the armature core laminations together and sealing the mold against any escape of plastic material injected therein. Following compression of the press platens 50 and 51, a plastic thermosetting insulating material is injected into the mold cavity through the port 70 preferrably at 150–200 lbs/ in$^2$ or about one tenth the pressure at which the mold segments are closed.

Prior to winding the wire coils 30 on the armature core 15, additional slot insulation may be provided by inserting into each armature slot 20 a layer of electrical insulation comprising a folded paper strip 80 which has been coated or impregnated with a plastic material such as mylar or the like. The plastic material not only improves the insulating characteristics of the paper but also adds body to the paper increasing the retention of any fold, bend or crease which is made in the paper. As shown in FIG. 6, the slot insulating paper strips 80 are preferrably made slightly longer than the length of the slots and by subjecting the projecting paper extremities to the action of crimping dies 81, the projecting extremities of each paper strip are flared outwardly thus locking the strips from accidental lengthwise shift as coil winding is initiated.

The armature construction of this invention not only provides for highly effective electrical insulation and minimizes wasteful escape of molded insulation material or application thereof into the armature slots, but also provides a method for producing continuous insulation of a motor armature particularly well suited for automatic or robotic operation.

I claim:

1. The method of producing a double insulated electric motor armature including a metal motor shaft and an armature core having a motor shaft accommodating clearance bore and peripheral slots of common root diameter defined between evenly spaced radial arms, said slots extending parallel to the motor shaft bore and provided by a stack of identical metallic laminations, said method comprising:

arranging said stack of armature core laminations in alignment with one another;

providing a pair of mold members each formed with a planar lamination engaging surface, a cylindrical mold cavity extending from said planar mold surface and having a diameter less than the root diameter of said armature core slots, shallow mold cavities equal in number to said armature core lamination radial arms formed in said planar mold surface radiating in evenly spaced relation from said cylindrical cavity and each dimensioned slightly smaller than said radial lamination arms;

arranging said pair of mold members spaced from each other with said planar surfaces in opposed parallel relation, said cylindrical mold cavities coaxial and the radial cavities of each mold in alignment;

orienting said aligned stack of armature core laminations between said mold members coaxially of said cylindrical mold cavity and with each shallow mold cavity arranged completely within the confines of a respective one of said radial core lamination arms;

supporting said motor shaft coaxially within said clearance bore in said stack of armature core laminations and said cylindrical mold cavities;

applying a pressure urging said mold members against said stack of armature laminations; and injecting a thermosetting plastic insulating material into said mold cavity under a pressure approximately one tenth that of the pressure urging said mold members against said stack of armature laminations.

* * * * *